Aug. 30, 1938.　　　V. E. KIELIAN　　　2,128,679

ILLUMINATED LICENSE PLATE HOLDER

Filed July 26, 1937

Inventor
V. E. Kielian

Patented Aug. 30, 1938

2,128,679

UNITED STATES PATENT OFFICE 2,128,679

ILLUMINATED LICENSE PLATE HOLDER

Valeria E. Kielian, Silver Creek, Nebr.

Application July 26, 1937, Serial No. 155,732

5 Claims. (Cl. 40—132)

The present invention relates to license plate holders for application to automobiles, trucks, trailers and the like.

An object of this invention is to provide a license plate holder wherein is combined the feature of illuminating the license plate and at the same time to encase and protect the license plate against dust and other accumulations from the roadway, rain and the like, and to admit of the locking or sealing of the plate holder from access by unauthorized persons. Thus, this object of the invention offsets, and practically eliminates the removal or substitution of license plates on a vehicle in the case of theft, or other crime.

Another object of the invention is to provide a holder for license plates admitting of the reflected illumination thereof from a shielded electric lamp or the like so that the rays of light emitted from the lamp may strike the surface of the license plate and be reflected outwardly through the holder thereof and be diffused through a relatively large transparent panel or the like to effect a clear vision of the indicia on the plate from a considerable distance behind the vehicle.

A further object of this invention is to provide a license plate holder of such construction that it may be mounted upon the rear trunk or compartment door of an automobile body, and which may be disposed with its accessible portion at the inner side of the door on the vehicle and may be locked independently in closed position so that the license plate in the holder is protected not only by the lock on the vehicle body door but also by the independent lock on the license plate holder.

With the foregoing and other objects in view, the invention will be more fully described hereinafter, and will be more particularly pointed out in the claims appended hereto.

Figure 1:
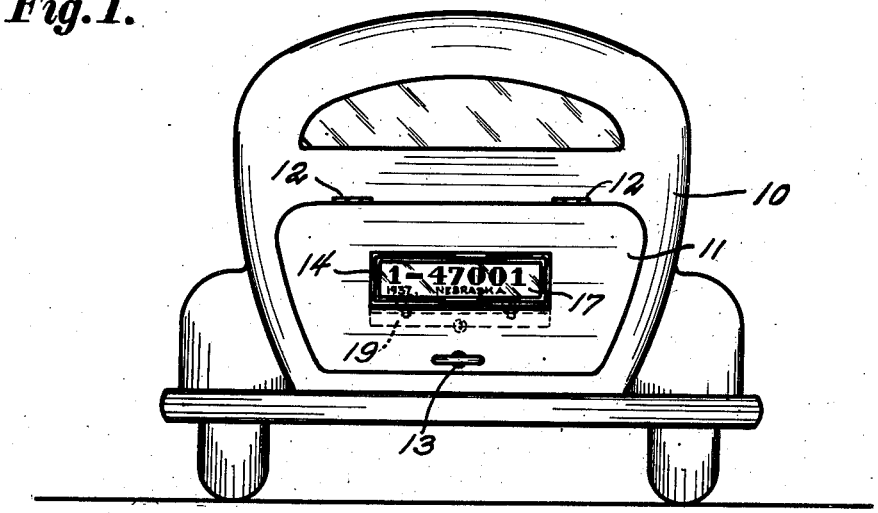
Figure 2:
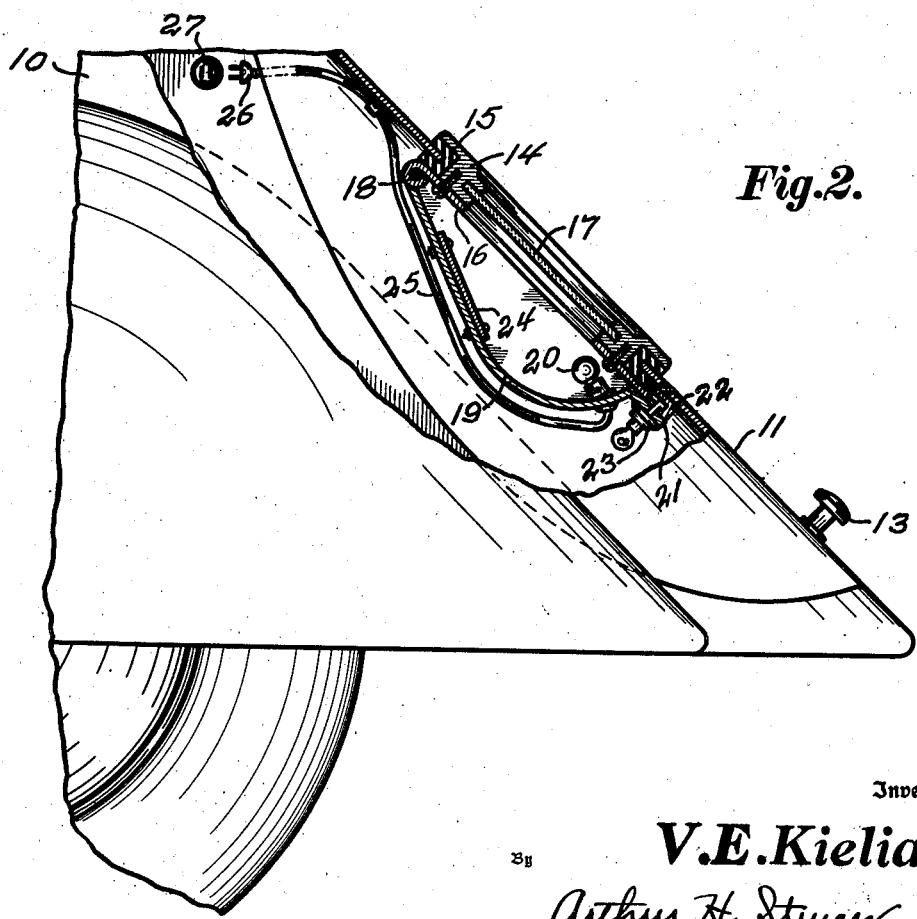

In the drawing, wherein like symbols refer to like or corresponding parts throughout the several views, Figure 1 is a rear elevation of a motor vehicle having a license plate mounted thereon and constructed according to the present invention;

Figure 2 is an enlarged vertical section taken through the holder and the adjacent portions of the vehicle, the latter being shown fragmentarily.

Referring now to the drawing, 10 designates a motor vehicle body of any suitable type provided with a rear compartment or trunk closed by the door 11 of present-day vehicle construction. The door 11 is mounted at its upper portion upon hinges 12 or the like and at its lower end is secured by the usual lock handle 13.

From Figure 2 it will be noted that the rear door 11 of the vehicle is inclined at substantially 45 degrees, and this inclination varies with different types of compartments or trunks incorporated in the vehicle body structure.

The plate holder of this invention comprises a frame 14 which may be rectangular in form as shown in Figure 1, or may be of any other suitable configuration adapted to display in the frame the data or indicia which is placed upon the license plate for the vehicle. The frame 14 is rabbeted at its outer edge and adapted to fit into an opening which is cut or otherwise provided in the rear door 11 of the vehicle body. Within the rabbet of the frame 14 is seated a cushioning ring 15 of rubber or the like which is slotted at its outer edge for engaging about the marginal edge of the opening in the door 11. This ring 15 serves not only to absorb shock incident to vibration of the vehicle, but also serves as an electrical insulation between the frame 14 and the vehicle body. The frame 14 at its inner end is provided with an attaching plate 16 which is secured against the inner face thereof by screws or the like as shown and which conforms in general shape to that of the frame 14. The plate 16 extends outwardly from the inner marginal portion of the frame 14 to engage the packing ring 15 and compress the same within the marginal edge portion of the frame 14 and about the edge of the vehicle door 11.

The frame 14 carries a transparent pane 17 of glass or the like which is permanently mounted in the frame 14 in any suitable manner such as in assembling the frame.

The upper edge portion of the plate 16 is rolled over to provide an eye through which a pintle 18 is secured and which provides a hinge or pivot for a cover plate 19. The cover plate 19 is in the form of a hood, the side walls of which are bent toward the plate 16 and adapted to abut in edgewise relation thereagainst. The cover plate or hood 19 when closed has its back wall inclined at a downwardly flaring angle with respect to the frame 14 to provide an enlarged compartment in the bottom of the hood 19 within which is mounted a lamp 20 which provides the source of illumination for the holder. The lamp 20 is located at the lowermost point in the hood adjacent and below the inner marginal edge of the frame 14. In this location direct rays of the lamp are not transmitted rearwardly in a direct line so that only the reflected rays from the lamp are visible through the opening in the frame 14. The lower flared end of the cover plate or hood 19 is provided with a flange 21 which engages a flange 22 projecting from the lower portion of the plate 16. The flange 22 is slotted to receive a locking bolt or the like which is carried upon a key-controlled lock 23, so that the hood 19 may be locked closed against the inside of the vehicle door 11.

The license plate 24 is secured, by bolts or the like, against the inner side of the cover plate 19 toward its upper end and is thus supported with its surface at an angle from the rays projecting from the lamp 20 so that the light rays are reflected from the plate 24 through the transparent pane 17. The inner surface of the cover plate or hood 19, at both its back portion and at its side walls, is given a high lustre or like reflecting finish and may be coated with chromium, nickel or the like. The data appearing on the face of the license plate 24 is thus illuminated and reflected backwardly, and enlarged so as to substantially fill the space within the frame 14, as shown in Figure 1.

The license plate 24 is thus completely enclosed in a housing so that dust, moisture and the like have no access to the face of the plate, and the characters painted on the plate thus remain clear and are not subject to constant cleaning and rubbing which quickly effaces the characters and destroys the use of the plate. The transparent pane 17 may readily be cleaned by wiping or washing off the rear exposed surface thereof, such as when the vehicle body is cleaned, and the license plate 24 is thus protected against injury during the washing or cleaning operations. Access may be only had to the plate by use of a key which controls the lock 23 for the hood 19.

Current may be supplied to the lamp 20 in any suitable manner, such as by a cord 25 which may be extended around the inner side of the hood 19 to the top portion of the door and connected by a plug 26 with a socket 27 leading from the source of current, such as the batteries of the vehicle.

It is obvious that various changes and modifications may be made in the details of construction and design of the above specifically described embodiment of this invention without departing from the spirit thereof, such changes and modifications being restricted only by the scope of the following claims.

What is claimed is:

1. A license plate holder for automobiles comprising a frame having a transparent pane therein and adapted to be mounted in the rear wall of an automobile body, a hood hinged upon the inner side of said frame and adapted to carry therein a license plate facing the transparent pane in said frame, and a source of illumination mounted in one end of the hood in an angularly forward position with respect to the license plate for reflecting the surface characters on said plate through said transparent pane.

2. A license plate holder comprising a frame having a transparent window therein and adapted for mounting in the rear wall of a vehicle body, a hood mounted upon the rear side of said frame and adapted to support a license plate with its character-bearing surface spaced from said window in the frame, and a source of illumination disposed in the hood out of line with said license plate and forwardly thereof for projecting light rays on the surface of said plate for reflection through said window.

3. A license plate holder comprising a frame having a packing ring thereabout and adapted for mounting in an opening of the rear wall of a vehicle, a hood hinged to the inner side of said frame and flaring downwardly therefrom and adapted to support at its inner side a license plate opposite the central portion of said frame, a transparent pane closing the opening in said frame, and a source of illumination disposed in the larger end of said hood and forwardly thereof for projecting light rays upon the plate to admit reading of the plate through said transparent pane.

4. A license plate holder comprising a frame having a packing gasket thereabout and adapted to be mounted in the opening of the rear wall of a vehicle body, a securing plate mounted upon the inner side of the frame for holding the latter to said rear wall, a downwardly flaring hood hinged at its upper end upon said plate and adapted to support a license plate therein opposite and at an angle to said frame, a source of illumination mounted in the lower end of the hood out of line with the plate for illuminating the surface thereof, locking means between the hood and the frame for securing the license plate against unauthorized removal, and a transparent pane mounted in said frame through which the illuminated surface of the license plate may be viewed.

5. A license plate holder comprising a frame adapted to be mounted through the rear wall of a vehicle body and having a transparent window therein, an enclosing hood pivotally mounted at its upper end to the inner side of said frame and flaring downwardly to provide an enlarged compartment in the rear of the frame, means for securing a license plate against the inner wall of the hood at an angle to and spaced from said window, and a source of illumination mounted in the lower enlarged end of the hood adjacent the bottom of the frame for projecting light rays at an angle upon the surface of the license plate for illuminating the same and reflecting the light rays through said window.

VALERIA E. KIELIAN.